United States Patent [19]

Pershan et al.

[11] Patent Number: 5,982,870
[45] Date of Patent: Nov. 9, 1999

[54] METHOD FOR CONCURRENTLY ESTABLISHING SWITCH REDIRECTION FOR MULTIPLE LINES OF THE PUBLIC TELEPHONE NETWORK

[75] Inventors: Barry Pershan, Olney, Md.; Von K. McConnell, Springfield, Va.; George Hasenauer, Greenbelt, Md.

[73] Assignee: Bell Atlantic Network Services, Inc., Arlington, Va.

[21] Appl. No.: 07/888,098

[22] Filed: May 26, 1992

[51] Int. Cl.⁶ .............................. H04M 7/00; H04M 3/50; H04M 3/54; H04M 3/58
[52] U.S. Cl. ....................... 379/221; 379/88.01; 379/127; 379/211; 379/212; 379/230
[58] Field of Search .................................. 379/67, 88, 89, 379/127, 142, 207, 210, 211, 212, 221, 225, 230, 67.1, 88.01, 88.28

[56] References Cited

U.S. PATENT DOCUMENTS

| | | | |
|---|---|---|---|
| 4,400,587 | 8/1983 | Taylor et al. | 379/221 |
| 4,475,009 | 10/1984 | Rais et al. | 379/211 |
| 4,611,094 | 9/1986 | Asmuth et al. | 379/201 |
| 4,670,628 | 6/1987 | Boratgis et al. | 379/211 X |
| 4,723,272 | 2/1988 | Maat | 379/211 |
| 4,754,479 | 6/1988 | Bicknell et al. | 379/221 |
| 4,800,583 | 1/1989 | Theis | 379/67.1 |
| 4,809,321 | 2/1989 | Morganstein | 379/211 |
| 4,885,780 | 12/1989 | Gopal et al. | 379/221 |
| 4,930,151 | 5/1990 | Walton et al. | 379/93.14 |
| 5,009,930 | 4/1991 | Gawrys et al. | 379/210 |
| 5,012,511 | 4/1991 | Hanle et al. | 379/211 |
| 5,018,194 | 5/1991 | Suzuki et al. | 379/207 |
| 5,023,868 | 6/1991 | Davidson et al. | 370/270 |
| 5,027,384 | 6/1991 | Morganstein | 379/88.23 |
| 5,029,196 | 7/1991 | Morganstein | 379/214 |

OTHER PUBLICATIONS

Mike Bush, "The Case For Voice Recovery Services" Inbound/Outbound, Nov. 1989, p. 54.

Harry Newton, "Your Very Own STP" Teleconnect, Aug. 1992, p. 12.

Primary Examiner—Harry S. Hong
Attorney, Agent, or Firm—McDermott, Will & Emery

[57] ABSTRACT

Advanced Intelligent Network (AIN) platforms include data bases populated with information pertaining to all phone numbers within a communications network. A large number of telephone numbers may concurrently be prespecified in a data base by a subscriber, together with alternate telephone number destinations corresponding to different locations, for redirection. Redirection set up for all of the subscriber's lines is accomplished by a single data entry operation into the data base in accordance with a template or table of designations customized by the subscriber. Redirection information may be transmitted to the AIN data base via a telecommunication line and an adjunct processing device associated with the AIN data base, using a terminal interface or dialed digit inputs; or the redirection information may be entered by interaction with a network switching office which sends the information to the data base via the network's signalling channels. Such information may specifically identify a portion, if not all, of the subscriber's lines. Each specified line may be associated with one or more redirected destinations.

4 Claims, 7 Drawing Sheets

FIG. 5(a)

| Main Number | Option #1 | Option #2 | Option #3 |
|---|---|---|---|
| 301-236-1399 | 301-236-1399 | 301-774-4244 | 301-649-1939 |
| 301-236-7352 | 301-236-7352 | 301-236-1734 | 410-997-5080 |
| 301-236-1555 | 301-236-1555 | 215-466-8486 | 215-466-4626 |
| 301-236-4087 | 301-236-4087 | 215-466-5272 | 201-649-1939 |

FIG. 5(b)

| Main Number | Mon.-Fri. 08:00-17:00 | Sat. 08:00-12:00 | Other |
|---|---|---|---|
| 301-236-1399 | 301-236-1399 | 301-236-1764 | 301-236-1555 |
| 301-236-7352 | 301-236-7352 | 301-236-2048 | 215-466-8486 |
| 301-236-1555 | 301-236-9874 | 215-466-7352 | 215-466-5272 |
| 301-236-4087 | 301-236-4696 | 201-649-1939 | 201-649-4789 |

FIG. 5(c)

| Main Number | 70% | 20% | 10% |
|---|---|---|---|
| 301-236-1399 | 301-236-1399 | 301-236-1764 | 301-236-2287 |
| 301-236-7352 | 301-236-7352 | 301-236-2048 | 215-466-8486 |
| 301-236-1555 | 301-236-1555 | 215-466-7352 | 215-466-5272 |
| 301-236-4087 | 301-236-4087 | 201-649-1939 | 201-649-4789 |

FIG. 5(d)

| Main Number | 1 | 2 | 3 |
|---|---|---|---|
| 301-236-1399 | 301-236-1399 | 301-236-1764 | 301-236-1555 |
| 301-236-7352 | 301-236-7352 | 301-236-2048 | 215-466-8486 |
| 301-236-1555 | 301-236-9874 | 215-466-7352 | 215-466-5272 |
| 301-236-4087 | 301-236-4696 | 201-649-1939 | 201-649-4789 |

FIG. 5(e)

| Main Number | Calling Code |
|---|---|
| 301-236-1399 | ABC1 |
| 301-236-7352 | ABC2 |
| 301-236-1555 | ABC3 |
| 301-236-4087 | ABC4 |

| Calling Code | Calling Number | Option #1 | Option #2 |
|---|---|---|---|
| ABC1 | 301-236-1399<br>301-326-8745<br>301-234-5678<br>301-774-3256 | 301-774-4244 | 301-649-1939 |
| ABC2 | 301-236-9852<br>301-258-8745<br>301-236-6512<br>301-347-4514<br>301-774-9861<br>301-679-0001 | 301-236-1734<br>215-466-8486 | 410-997-5080<br>215-466-4626 |
| ABC3 | 301-236-1555 | 215-466-7352 | 215-466-5272 |
| ABC4 | 301-236-6587<br>301-430-9856 | 215-466-5272 | 201-649-1939 |

METHOD FOR CONCURRENTLY ESTABLISHING SWITCH REDIRECTION FOR MULTIPLE LINES OF THE PUBLIC TELEPHONE NETWORK

CROSS-REFERENCES TO RELATED APPLICATIONS

This application is related to applications Ser. No. 07/843,040, filed Feb. 28, 1992, now U.S. Pat. No. 5,247,571, entitled "Area Wide Centrex" and Ser. No. 07/845,924, filed Mar. 5, 1992, now U.S. Pat. No. 5,353,331 entitled "Personal Communications Service Using Wireline/Wireless Integration." Both applications are commonly assigned with the present invention.

TECHNICAL FIELD

The present invention relates generally to switch redirection of telephone calls and more particularly to a method and system for concurrently prescribing future incoming call redirection destinations and schedules for a large number of telephone lines in the public telephone network.

BACKGROUND ART

Telecommunication services have expanded remarkably in recent years. Subscribers have gained increasing flexibility in the selection and implementation of the various features that are available. A popular option provides the subscriber with the ability to determine in advance alternate destinations for an incoming call that is intended by a dialer for connection to the subscriber's telephone line. Several prior art call forwarding arrangements have been developed.

Boratgis et al., U.S. Pat. No. 4,670,628, discloses an automatic call forwarding device which is connected to a forwarding phone having a three-way conference service by a single phone line to central exchange telephone equipment. The device operates to cause a calling phone to be put on hold while a message transmitting and storage device transmits telephone dialing pulses corresponding to the number of a third phone to which the call is to be forwarded. The device is adapted to be reprogrammed by encoder signals provided by tone pulses of a standard touch tone telephone.

Rais et al., U.S. Pat. No. 4,475,009, discloses a system for remotely controlling call forwarding for a given telephone line. The call forwarding is initiated by sequentially applying a call forwarding initiate code and thereafter a desired call forwarding telephone number stored by input means connected to a given telephone line. The given telephone line is seized when an incoming call to the line is placed, and the call is forwarded to the stored telephone number.

Morganstein, U.S. Pa. No. 4,809,321, 5,027,384 and 5,029,196, describe user programmable telecommunications systems, which allow a called party to preprogram alternate destinations for incoming calls in response to a busy or no-answer status of the called party. A calling party can be apprised by a verbal prompt of an alternate destination at which the called party then may be available. The system provides an initial greeting to all incoming calls which may identify the called party and may issue a statement as to the nonaccessible condition of the intended telephone set. The incoming calls can be routed to a voice store and forward facility so that a verbal message can be deposited by the calling party.

Suzuki et al., U.S. Pat. No. 5,018,194, discloses a switching system for effecting call forwarding between subscribers. Discrimination information is added to the data for respective subscriber terminals. Each subscriber terminal may be registered in a storage unit as a single alternative destination for forwarding a call by another subscriber terminal. The inhibition of a subscriber terminal from being registered as more than one alternative destination avoids an endless loop at the stage of the call forward registration.

Davidson et al., U.S. Pat. No. 5,023,868, discloses an automated call handling apparatus for use with one or more ISDN switches connected to telephone stations. A computer connected to the switching system responds to an associated message indicating an incoming call to one of the stations by selecting an alternate destination station and transmitting digital messages to cause the switching system to forward the incoming call to the selected alternate destination. Incoming calls are forwarded in accordance with predefined criteria. The computer can answer an incoming call with a recorded message which may prompt a caller to leave a message.

Hanle et al. U.S. Pat. No. 5,012,511, describes conventional call forwarding schemes, including the enablement by a subscriber of the call forwarding feature by remote access. In the Hanle et al. arrangement, remote programming of a switch for call forwarding may be made by a subscriber on a high speed basis.

Conventional call forwarding service, as exemplified by the above described patents, generally permits the subscriber to effect reprogramming of the switch, or a computer associated with the switch, to control processing of calls directed to an individual subscriber line. The service is a switch feature wherein an incoming call will terminate on the line side of the switch and be forwarded to a programmed alternate destination. While the programming need not necessarily be undertaken from the telephone set associated with the subscriber line, each programming operation is performed for a single line or at most for a few lines or numbers.

The set up of the call forwarding service for a single line or number at one time is burdensome for subscribers having a large number of subscriber lines or numbers or, for example, subscribers having a PBX serving many extension sets. In the event of a Central Office failure, PBX failure, cable cut, fire, flood or other disaster, the subscriber would have to undertake a call forwarding set up procedure for each of the multitude of lines.

The ability to designate substitute call destinations for a large plurality of lines is desirable in many situations other than disaster conditions. A large business subscriber may require incoming calls to some or all lines of one department to be redirected to lines of one or more other departments. Such a subscriber may want to break the large organization into smaller sectors. A sector might be a floor, a department, a building or some breakdown less than the whole organization.

The organization may be dispersed over a wide geographical area. If sectors operate during different business hour schedules, it would be beneficial to redirect all incoming calls for sectors that are closed at a given time to other sectors that are open for business. A smaller business, on the other hand, may need to redirect calls to all of its lines to a single substitute location.

Conventional call forwarding severely limits the subscriber's ability to redirect incoming calls on such organizational bases. The need exists for redirecting with ease a large quantity of telephone numbers in groupings selected by the subscriber. For example, if calls are received in greater quantity than the incoming lines can handle at peak business hours, it would be desirable to have overflow calls redirected to a second location during such period. Similarly, if a redirected location is not capable of handling a full load of redirected calls, it would be desirable to have the ability to redirect such calls either on an apportioned basis to more than a single location, or on a selectable basis to multiple locations. Thus the party making an incoming call could be greeted with a recording such as: "We are experiencing a communication failure. If you press '1,' we will redirect you to our New Jersey office; press '2,' and we will redirect you to voice mail; press '3,' and we will redirect you to the Company operator." Another desirable feature would be to redirect calls on a selective basis depending on the identity of the calling party or number. Conventional call forwarding systems, however, fail to meet any of these needs.

The above discussed needs of a subscriber to service incoming calls to telephone lines which are not able to receive those calls exist even if the subscriber does not have operable secondary locations. In those instances, it would be desirable to be able to advise the caller that the dialed destination is not available for telephone conversation and to provide the caller an opportunity to leave an appropriate message. Conventional call forwarding devices do not permit redirection of a large number of telephone line destinations to a voice messaging service with, for example, messages for particular subscriber departments individually grouped.

Additional disadvantages of conventional call forwarding stem from the fact that the programming of the alternate location resides in the central office switch or a processor associated closely therewith. Voice or data calls are transmitted to and terminated at the switch and then forwarded. Lines that need not be used in the final voice or transmission connection are unnecessarily tied up. The time necessary to make the final connection over the diverted route is longer than would occur if the ultimate voice or data connection were made directly.

DISCLOSURE OF THE INVENTION

Accordingly, an object of the present invention is to enable concurrent redirection of calls for large quantities of telephone numbers, in an easy and efficient manner.

Another object of the invention is to permit the subscriber, in the set up of such concurrent redirection, to designate groups of such telephone numbers for respective different locations, with the added ability to establish a time schedule for the designations.

Yet another object of the invention is to provide the subscriber flexibility during the call redirection set up. For example, the subscriber should be able to designate alternative redirect locations during selectable time periods for any or all numbers, and the approximate percentage of redirected calls to each designated alternative location during each selected time period. The subscriber might also have the option to select redirection based upon the telephone number of the incoming caller or the option to allow the caller to choose the direction by giving prompts as to available options and accepting option selections from the caller (e.g., auto-attendant).

Another object of the invention is to inform persons calling any of a plurality of lines or numbers subject to redirection of the unavailability of the intended destination telephone number and permit such persons to leave messages that will be associated with such telephone number.

Another object of the invention is to allow the subscriber to connect to a central data base storing redirection information to permit the subscriber to add or delete numbers and parameters. Therefore, the subscriber has total control over his or her network.

A further object of the invention is to decrease the time during which a voice, data or multimedia connection path is made between the initiating caller and the redirected destination.

A still further object of the invention is to establish a voice, data or multimedia connection path between the initiating caller and the redirected destination without seizing unneeded voice lines between the caller and the original destination.

The above objects and other objects of the invention are satisfied, at least in part, by providing redirection as a network feature, rather than as a switch feature. In accordance with the invention, Advanced Intelligent Network (AIN) platforms include data bases populated with information about all phone numbers within the network. A large number of telephone numbers may concurrently be prespecified by the subscriber in a data base, together with alternate telephone number destinations corresponding to the telephone lines, for redirection.

Redirection set up for all of the subscriber's numbers may be accomplished by a single data entry operation into the data base in accordance with a template or table of designations customized by the subscriber. Redirection information may be transmitted by telecommunication line to an adjunct processing device associated with the AIN data base, either using dialed digit inputs or using modems and a data terminal. Alternatively, the subscriber may input redirection information via prompt and dialed digit type interactions with an appropriately equipped switching system which in turn communicates with an AIN data base. Such information may specifically identify a portion, if not all, of the subscriber's set of lines or numbers. Each specified number may be associated with one or more redirected destinations. Alternatively, groups of specified numbers may be designated for such alternative destinations. Subscriber's alternative destinations may be designated for a given time period, with a preset percentage apportionment of incoming calls to each destination. Several schedules may be input to the data base, with each schedule containing prespecified redirection information for itemized time periods. A subscriber may select between stored schedules, to activate a redirection schedule, simply by dialing into the adjunct processing device or by interactive inputs via the switching system.

Incoming calls to any of the prespecified telephone numbers will be redirected to the corresponding destinations, as prespecified, by means of common channel signaling. The network can initiate AIN processing for call redirection using a terminating trigger methodology, but the preferred embodiments will use an initiating trigger which may be manipulated by the data base. In this preferred triggering approach, the trigger is under the control of the AIN platform. No seizure of a trunk voice line path to the central office or switch of the dialed telephone line number will occur if the call is to be redirected to a different central office or switch. Therefore calls, rather than being forwarded, are redirected before line seizure.

Additional objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIGS. 5(a) to 5(e) are charts showing examples of a redirection set up plans in accordnace with the invention.

BEST MODE FOR CARRYING OUT THE INVENTION

Figure 1:
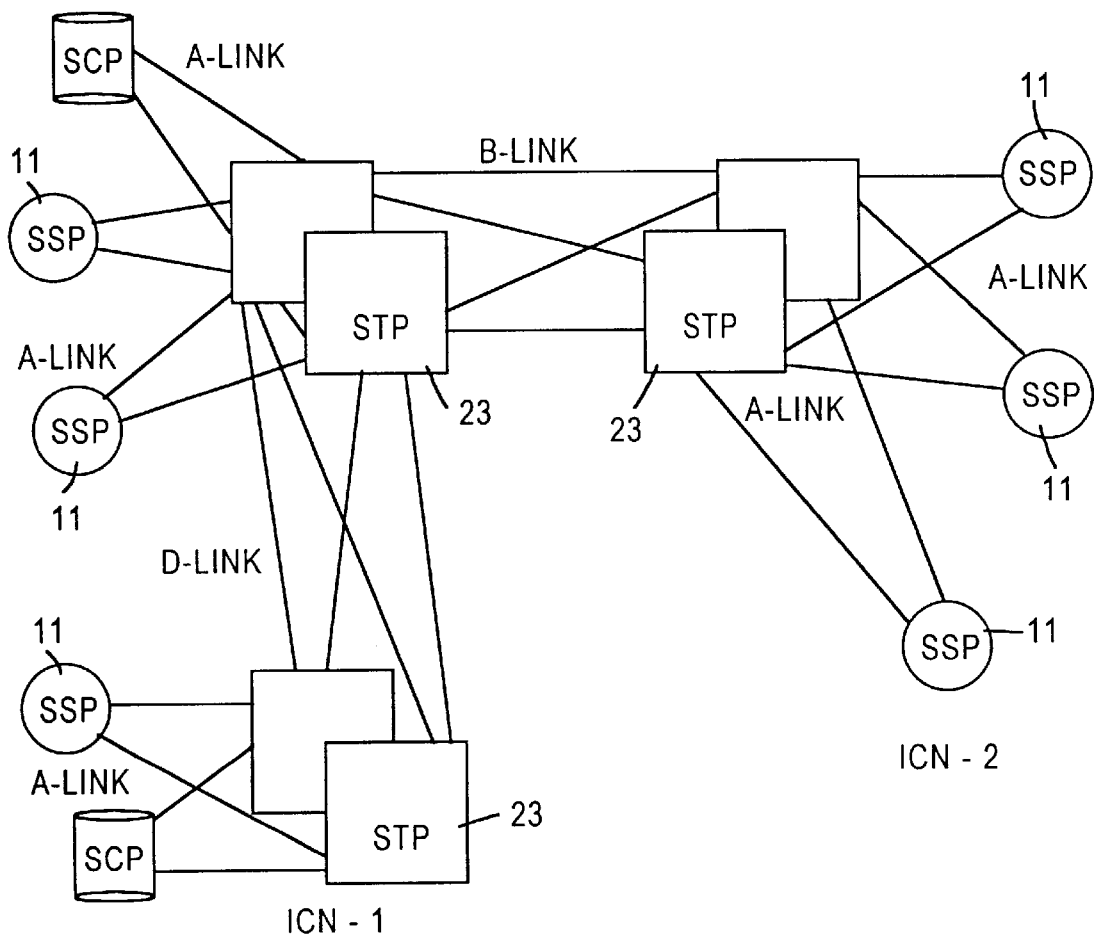
FIG. 1 is a diagram representing a common channel signaling network serving a large geographical area.

The present invention makes advantageous use of common channel signaling for providing a redirected signal path prior to voice line connection between the originating caller and the redirected destination. FIG. 1 is a diagram of a common channeling signaling network using SS7 protocol.

Common channel signaling uses an out-of-band signaling path that is separate from the path used for voice transmission. This signalling technology provides for faster call set-up times and a more efficient use of the voice network than prior in-band signaling, dial pulse signaling or multi-frequency signaling schemes wherein the trunk connecting the calling and the called subscribers required both signaling and voice transmission over the same circuitry. When a call is placed, the voice communication is suspended while signaling is transmitted through the common channel signaling network to check whether the line at the destination switch is busy and to determine the voice connection path.

FIG. 1 depicts a network covering a large geographic area including several interconnect network portions denoted, for example, as ICN-1 and ICN-2. Local telephone lines are connected by individual telephone stations in each geographic area to a Service Switching Point (SSP) which may be included in the closest CO. Each CO connects via trunk circuits (not shown) to one or more of the other COs, and each CO has a CCIS data link to a Switching Transfer Point (STP) 23. Redundant STPs are provided for backup reliability. The trunk circuits carry large numbers of telephone calls between the CO's.

Control logic and feature data are located at a centralized node in the network called a Service Control Point (SCP) 43. SSPs communicate with the SCP through the associated STP. B-link or D-link lines interconnect STPs, while A-link lines interconnect the STPs with either SCPs or SSPs.

If a call requires a feature service such as call redirection, an SSP is triggered to communicate with an SCP on the basis of a predetermined characteristic of the call, such as origination from a particular line or dialing of a particular set of digits. If a trigger occurs, a query message is sent to the SCP to obtain instructions. The SCP, if provided with appropriate data base storage and processing capability, can determine the nature of the service and information appropriate to routing of the call. Redirection of the call can be signaled through the STP(s) to seize a trunk circuit between the originating CO and the redirected destination CO.

Figure 2:
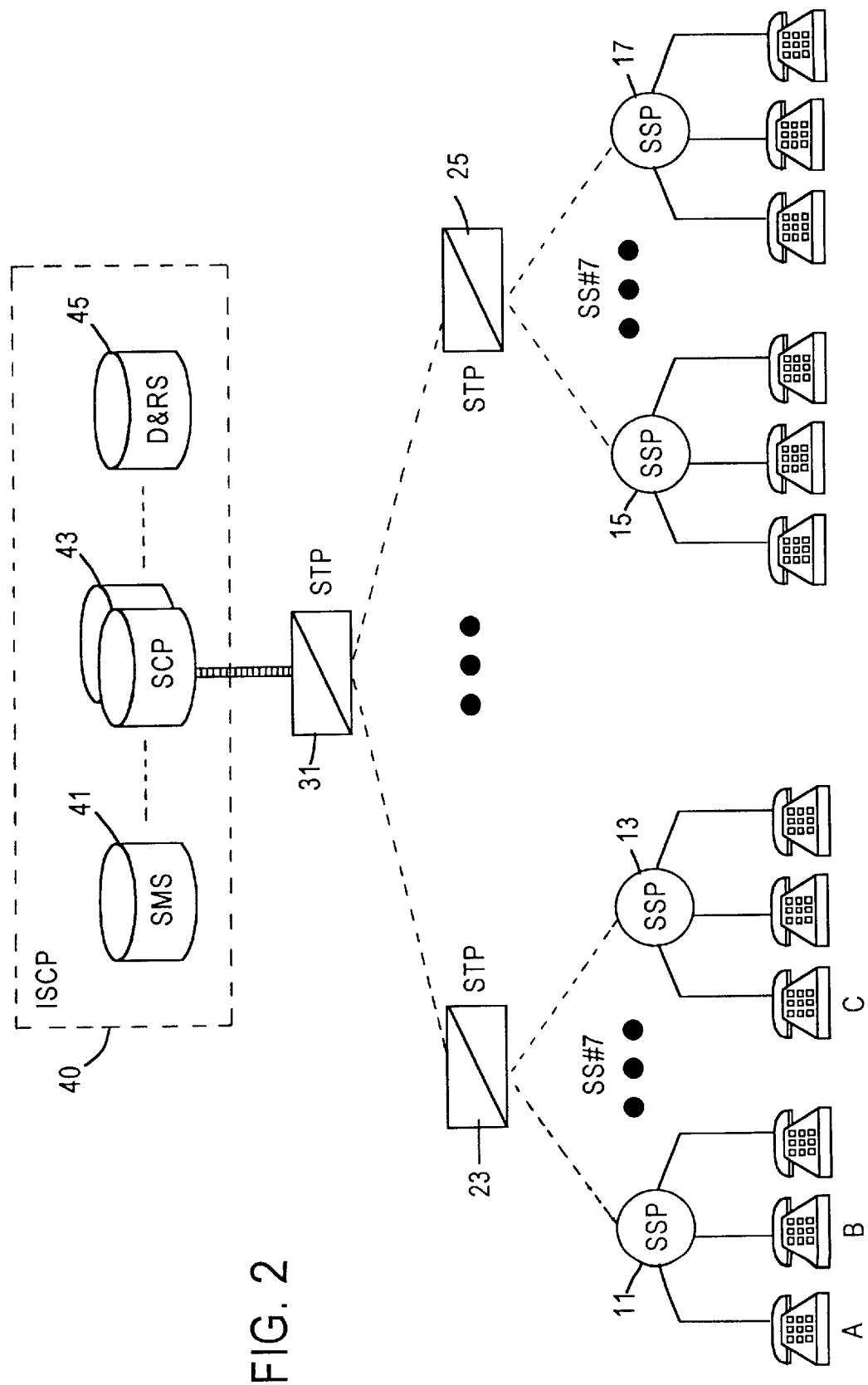
FIG. 2 is a schematic block diagram of the components of an Advanced Intelligent Network system corresponding to a portion of the network shown in FIG. 1, shown in somewhat more detail, according to the invention.

FIG. 2 is a schematic block diagram of the components of an Advanced Intelligent Network (AIN) in accordance with the invention. The SCP 43 is part of a control node, referred to as an ISCP 40, having enhanced capabilities to be described in more detail hereinafter. Such enhanced capabilities permit a wider variety of communication features and service control. Calls subject to enhanced features contain information which enable the AIN network to trigger the enhanced operation, such as call redirection, and are hereinafter termed "AIN type calls."

All of the CO's 11, 13, 15 and 17 in the embodiment of FIG. 2 are equipped and programmed to serve as SSPs. Such central office switching systems typically consist of a programmable digital switch with CCIS communications capabilities. One example of such a switch is a 5ESS type switch manufactured by AT&T. Other vendors, such as Northern Telecom and Siemens, manufacture comparable digital switches. SSPs are appropriately equipped programmable switches present in the telephone network, which recognize AIN type calls, launch queries to the SCP and receive commands and data from the SCP to further process the AIN calls. In instances in which the SSP functionality is not present in the CO, end offices without such functionality forward calls to an SSP at its prescribed point in the network.

The SSPs 11 and 13 connect to a first local area STP 23, and the SSPs 15 and 17 connect to a second local area STP 25. The connections to the STPs are for signalling purposes. As indicated by the black dots below STPs 23 and 25, each local area STP can connect to a large number of SSPs. Although not shown in FIG. 2, as in FIG. 1, the central offices or SSPs are interconnected to each other by trunk circuits for carrying telephone services.

The local area STPs 23 and 25, and any number of other such local area STPs, shown as black dots between STP's 23 and 25, communicate with an STP 31 associated directly with an ISCP 40 to serve the entire area. The STP hierarchy can be expanded or contracted to as many levels as needed to serve appropriately subscriber demand. The links 23 and 25 between the COs and the local area STPs are dedicated CCIS links, typically SS7 type interoffice data communication channels. The local area STPs are in turn connected to each other and to the regional STP 31 via a packet switched network. The regional STP 31 also communicates with the ISCP 40 via a packet switched network.

The ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE (not shown) for programming the data base in the SCP 43 for the services subscribed to by each individual business customer.

The messages transmitted between the SSPs and the ISCP are all formatted in accord with the Transaction Capabilities Applications Protocol (TCAP). The TCAP protocol provides standardized formats for various query and response messages. Each query and response includes data fields for a variety of different pieces of information relating to the current call. An initial TCAP query from an SSP includes, among other data, a "Service Key" which is the calling party's address and digits representing the called party address. The TCAP specifies a number of additional message formats, for example a format for a subsequent query from the SSP, and formats for "INVOKE" responses for instructing the SSP to play an announcement or to play an announcement and collect specified numbers of digits.

Each central office switching system normally responds to a service request on a local communication line connected thereto to selectively connect the requesting line to another selected local communication line. The connection can be made locally through only the connected central office switching system if the originating location and the destination location are served by the same central office switch. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnecting the two COs.

Although shown as telephones in FIG. 2, the terminals can comprise any communication device compatible with the line. Where the line is a standard voice grade telephone line, for example, the terminals could include facsimile devices, modems etc.

Figure 3:
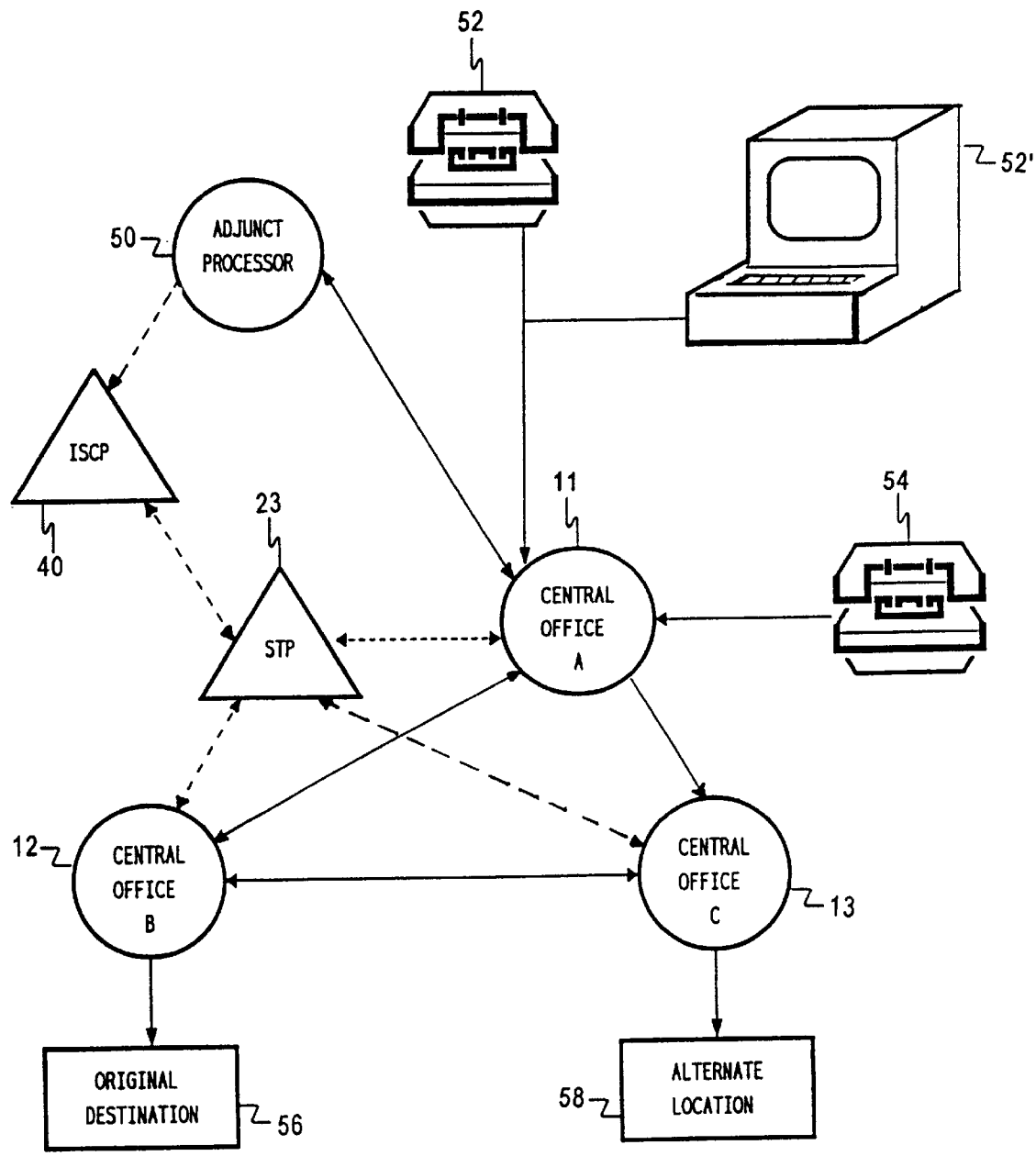
FIG. 3 is a schematic block diagram, according to the invention, depicting the network interconnection and signaling paths in the course of a redirection of a call from an originating telephone set and additionally depicting network elements for redirection set up.

FIG. 3 is a diagram representing an AIN network having an ISCP with an associated service creation environment, a signaling network and interoffice trunks. Similar to FIG. 2, COs 11, 12 and 13 are associated with STP 23, under control of ISCP 40. Telephone 54, representing an originating call, is served by CO 11. Blocks 56 and 58 represent destination locations served respectively by COs 12 and 13. SS7 signaling paths are depicted by dashed lines; and voice communication paths are indicated by solid lines.

One advantage of the present system is that the customer can set up and modify the customer's own stored redirection data file at any time, to suit that customer's current communication service needs. The present invention can provide such control by allowing the customers one of many different forms of access to their data files in the ISCP.

Preferred implementations of such a service creation/modification feature would use an interactive voice and DTMF input type access procedure. The customer would dial a specified number to initiate programming. For example, a call from telephone 52 could be routed through the network to an appropriate automated voice response system, shown as an adjunct processor 50, coupled to the ISCP. Alternatively, an SSP capable central office connected to the line, such as CO 11 connected to the line from telephone station 54, could interpret the dialed number as an AIN trigger. In such a case, the CO would subsequently respond to instructions from the ISCP by sending prompting messages to the calling customer and forwarding dialed digits and automatic number identification (ANI) data to the ISCP as TCAP messages. In either of these first two cases, the system would also execute a security procedure. The security procedure could use a password identification, for example a DTMF input of a personal identification number or a voice recognition of a particular user's enunciation of a password. If the customer calls from one of that customer's own lines, the ANI information for the call also serves to identify the customer, and the secured access procedure can use this customer identification alone or in combination with password recognition to grant access only to the identified customer's files.

In an alternative preferred embodiment, access might be provided via a Personal Computer, a data terminal or some other form of work station, shown as a terminal 52' (a VT100 emulation) in FIG. 3. Such a customer would call in and establish a data link to the ISCP using a modem, and this access may also proceed through the adjunct processor which would include a modem. Security may be controlled through password identification, terminal identification and/or recognition of the line from which the terminal calls in to the ISCP. Using such a terminal oriented access system, the subscriber could add or delete telephone numbers which are subject to redirection.

FIG. 3 shows a solid line representing a voice connection between the CO 11 and the adjunct processor 50. This connection can be a voice grade line or trunk circuit, or this connection could be an ISDN line including voice and data channels.

FIGS. 5(a) to 5(e) are charts indicating examples of several alternative redirection set up plans. Such a chart would be formulated by each subscriber in accordance with the subscriber's needs from paper or magnetic templates obtained from the service provider as an aid in supplying the information to the ISCP. Such information may be transmitted in a set up call or, alternatively, the subscriber can send the completed template by mail, facsimile or data link to the service creation environment. In the redirection set up, each plan would be stored in the data base, one of which being chosen to be currently operative. The subscriber may switch plans at any time simply by dialing into the ISCP via one of the means discussed above. Several such alternative options may be stored in the data base for future selection.

In each illustrated redirection plan, the left-hand column headed by the title "MAIN NUMBER" contains a subscriber's telephone numbers for which incoming calls are to be redirected to other locations. In the plans shown in FIGS. 5(a) to 5(d), the remaining columns are destination columns which each contain an alternative set of redirection information corresponding to the telephone numbers listed in the first column.

As shown, each row of the template may contain one or more telephone numbers that are designated for incoming call redirection to one or more destinations. The "MAIN NUMBER" designations in each row correspond to the same redirection numbers in that row. The main numbers may be from the same or different geographic areas. The dialing plan may indicate that all calls to the main number should go to one of three specified destinations depending on which of three options is currently active (FIG. 5(a)), or different numbers may be listed for specified time periods, as shown by the three alternate destination columns in FIG. 5(b). The first number, listed in the first destination column, typically will correspond to the main number. If the first option is active or the call comes in during the time period corresponding to that destination, the network routes the calls to the destination identified by the main number in the normal manner. When redirection becomes necessary, by activation of option #2 or option #3 in FIG. 5(a) or by a call coming in at a time corresponding to on of the alternate destinations as in FIG. 5(b), the network uses the destination number from the appropriate column to route the incoming call to the alternate destination.

The dialing plan illustrated in FIG. 5(c) allows the subscriber to apportion calls among the three destinations. The first destination column, typically containing the main number itself, indicates a seventy percent apportionment for incoming calls to the main numbers shown in the row. The second and third destination columns show twenty percent and ten percent apportionment of calls to the second and third alternate destinations, respectively. Apportionment of the calls between the main number and up to two alternates is done without human intervention in accordance with data base information. The listing is one example of various possibilities. Additional destinations can be included in each row with different apportionment percentages. The number of redirected destinations and percentage apportionment, if any, may alternatively be associated with a time schedule based, for example, on time of day or day of week.

The dialing plan of FIG. 5(d) provides redirection of calls to an auto attendant feature of the AIN network. With such a feature, a call is directed to the auto attendant and a message is transmitted to the caller upon redirection. The message may explain that the call is not to be completed to the dialed destination, describing the reason for redirection, and offer the caller options for completion of the call. Three options are shown, although the number of options is not so limited. The message may indicate what destinations the options represent and permit the caller to select an option by depression of a corresponding DTMF key. One or more of the options may represent a mailbox at which the caller may place a message for storage.

FIG. 5(e) illustrates the tables used for a redirection plan based on the identification of the telephone number of the calling party. As shown, this plan uses two tables. The first table contains the main number and a reference number or "calling code". The second table contains the calling code followed by a list of calling telephone numbers. If a call comes in from a line or station identified by one of the listed calling numbers, the system will redirect the call to a destination identified by option #1 or option #2, whichever is currently in effect at the time of the call. Calls coming in from stations identified by numbers not listed will be routed to the station corresponding to the main number.

Figure 4:
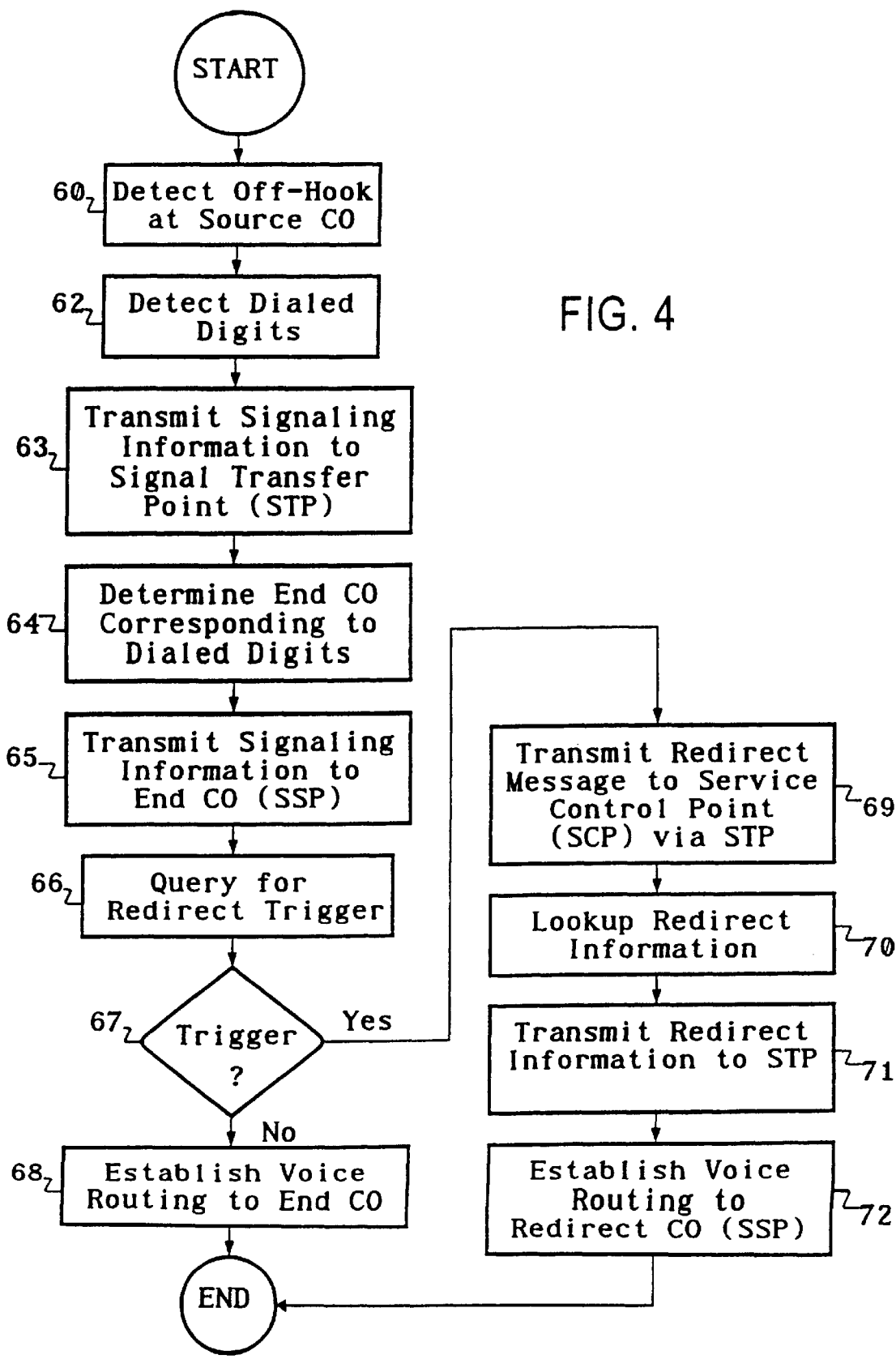
FIG. 4 is a flow chart showing a routine for a call redirected from a destination location associated with a first central office to an alternative destination associated with a second central office, in accordnace with the invention as shwon in the embodiment of FIG. 3.

A description of the manner in which the arrangement of FIG. 3 may redirect a dialed call is aided by the flow chart shown in FIG. 4. It is to be understood that, in practice, the communications network is widespread, including a multitude of COs, STPs and ISCPs, and it is possible to enable call redirection from any one location to any other location in the world in accordance with the invention.

In the call exemplified, it is assumed that the call originates at telephone 54, associated with central office A 11. The central office detects the off-hook condition and dialed digits, steps 60 and 62. Common channel signaling is initiated while the voice line is suspended and the signaling information is transmitted by central office A 11 to STP 23, step 63. The STP 23 determines that end office B 12 corresponds to the dialed call destination, step 64, and transmits signaling information to that end office, step 65. At the end office B 12 a query is made for a redirect trigger, step 66. If a determination is made in step 67 that no redirection trigger is set, a voice link, step 68, is established between central office A 11 and central office B 12.

If it is determined in step 67 that a redirect trigger has been set, a trigger message is transmitted with the signaling information to the ISCP 40 via the STP 23, step 69. The ISCP 40 looks up redirection information in the data base, step 70, and transmits redirection information to STP 23, step 71. In step 72, voice routing is established between central office A 11 and central office C 13, which corresponds to redirected alternate location 58.

In the example discussed, the trigger is regarded as a terminating trigger because the terminating office stores the trigger flag associated with the dialed number as it would for all numbers associated with the central office switch. A more advantageous use of the AIN network would occur with incoming call flag information removed from the central office switch to the STP. With such replacement, the trigger is regarded as an originating trigger as determination is made earlier in the signaling path. Not only is signaling time reduced, but redirection can be determined even if the termination central office is inoperative. The originating trigger environment would permit allocation of virtual numbers to the subscriber. Such numbers in themselves would not terminate in dialed destinations. Dialing a virtual number would trigger the originating office to direct signaling to the ISCP for the determination of the redirected destination in accordance with the redirection plan stored in the ISCP data base.

The ISCP, through information stored in its data base, supervises the call redirection signaling process. As part of the AIN network, the ISCP can track the redirected calls as well as redirection set up transactions. Such transactions include set up changes to any number of individual lines, addition or deletion of templates in data base storage and set up of a redirection trigger on demand by a subscriber call in. A report can be generated for individual subscribers that will describe the redirection transaction for each time the ISCP is referenced.

In this disclosure there is shown and described only the preferred embodiment of the invention and but a few examples of its versatility. It is to be understood that the invention is capable of use in various other combinations and environments and is capable of changes or modifications within the scope of the inventive concept as expressed herein.

What is claimed is:

1. In a communication network including a plurality of interconnected central office switching systems each at a different location, each of said central office switching systems connected to a plurality of local communication lines, a voice network portion comprising voice communication paths for interconnecting any of the central office switching systems, a common channel signaling network portion comprising signaling paths interconnecting said central office switching systems through at least one signal transfer point and at least one integrated services control point including a data base, a method for simultaneously redirecting a plurality of call paths for telephone numbers corresponding to local communication lines at a first set of locations in pre-set groups to local communication lines at one or more second locations, comprising the steps of:

storing call redirection information concurrently for all of said telephone numbers in said data base, said step of storing comprising accessing said integrated services control point and concurrently transmitting redirection information for said plurality of telephone numbers for storage in said data base, said redirection information indicating a plurality of alternative destinations for at least one of said telephone numbers;

setting a trigger in the network for each of said telephone numbers; and redirecting a voice communication path between an originating call location and one of said second locations in accordance with redirection information accessed from said data base in response to a trigger corresponding to one of said telephone numbers, and wherein said redirection information designates an apportionment percentage for call redirection to said alternative destinations.

2. In a communication network including a plurality of interconnected central office switching systems each at a different location, each of said central office switching systems connected to a plurality of local communication lines, a voice network portion comprising voice communication paths for interconnecting any of the central office switching systems, a common channel signaling network portion comprising signaling paths interconnecting said central office switching systems through at least one signal transfer point and at least one integrated services control point including a data base, a method for simultaneously redirecting a plurality of call paths for telephone numbers corresponding to local communication lines at a first set of locations in pre-set groups to local communication lines at one or more second locations, comprising the steps of:

storing call redirection information concurrently for all of said telephone numbers in said data base, said step of storing comprising accessing said integrated services control point and concurrently transmitting redirection information for said plurality of telephone numbers for storage in said data base, said redirection information indicating a plurality of alternative destinations for at least one of said telephone numbers;

setting a trigger in the network for each of said telephone numbers; and redirecting a voice communication path between an originating call location and one of said second locations in accordance with redirection information accessed from said data base in response to a trigger corresponding to one of said telephone numbers, and wherein said redirection information designates a time schedule for call redirection to each of said alternative destinations.

3. A method for simultaneously redirecting a plurality of call paths for telephone numbers corresponding to telephone lines at a first set of locations in a communications network in pre-set groups to telephone lines at one or more second locations, comprising the steps of:

storing call redirection information concurrently for all of said telephone numbers in a common data base at a control node located in the network remote from said first and second locations, said step of storing comprising accessing said control node and concurrently transmitting redirection information for said plurality of telephone numbers for storage in said data base, said redirection information indicating a plurality of alternative destinations for at least one of said telephone numbers;

setting a trigger in the network for each of said telephone numbers;

in response to dialing one of said telephone numbers at an originating location, determining whether a corresponding trigger exists in the network;

accessing said data base for redirection information in response to a trigger determination;

routing a voice connection path between the originating location and one of said second locations in accordance with redirection information accessed from said data base; and completing said voice connection path for transmission of voice or data or multimedia communications, and wherein said redirection information designates an apportionment percentage for call redirection to said alternative destinations.

4. A method for simultaneously redirecting a plurality of call paths for telephone numbers corresponding to telephone lines at a first set of locations in a communications network in pre-set groups to telephone lines at one or more second locations, comprising the steps of:

storing call redirection information concurrently for all of said telephone numbers in a common data base at a control node located in the network remote from said first and second locations, said step of storing comprising accessing said control node and concurrently transmitting redirection information for said plurality of telephone numbers for storage in said data base, said redirection information indicating a plurality of alternative destinations for at least one of said telephone numbers;

setting a trigger in the network for each of said telephone numbers;

in response to dialing one of said telephone numbers at an originating location, determining whether a corresponding trigger exists in the network;

accessing said data base for redirection information in response to a trigger determination;

routing a voice connection path between the originating location and one of said second locations in accordance with redirection information accessed from said data base; and completing said voice connection path for transmission of voice or data or multimedia communications, and wherein said redirection information designates a time schedule for call redirection to each of said alternative destinations.

\* \* \* \* \*